US006215630B1

(12) United States Patent
Schultz et al.

(10) Patent No.: US 6,215,630 B1
(45) Date of Patent: Apr. 10, 2001

(54) DIAMOND-LIKE CARBON AND OXIDE BILAYER INSULATOR FOR MAGNETORESISTIVE TRANSDUCERS

(75) Inventors: Allan E. Schultz, St. Paul; L. Vincent Ruscello; William H. Nunne, both of Burnsville, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 546 days.

(21) Appl. No.: 08/741,277

(22) Filed: Oct. 30, 1996

Related U.S. Application Data

(62) Division of application No. 08/571,469, filed on Dec. 13, 1995.

(51) Int. Cl.[7] .................................................. G11B 5/33
(52) U.S. Cl. ................................................. 360/320
(58) Field of Search .................... 360/113, 320; 338/32 R; 324/252

(56) References Cited

U.S. PATENT DOCUMENTS

| | | | |
|---|---|---|---|
| 4,052,749 | 10/1977 | Nomura et al. | 360/123 |
| 5,331,493 | * 7/1994 | Schwarz | 360/113 |
| 5,363,265 | 11/1994 | Hsie et al. | 360/113 |
| 5,541,793 | * 7/1996 | Schwarz | 360/121 |
| 5,594,933 | * 1/1997 | Hayashi et al. | 428/546 |

FOREIGN PATENT DOCUMENTS

| | | |
|---|---|---|
| 0 493 902 A2 | 7/1992 | (EP) . |
| 0 584 707 A2 | 2/1994 | (EP) . |
| 2 064 849 | 6/1981 | (GB) . |
| WO 95/18442 | 7/1995 | (WO) . |

OTHER PUBLICATIONS

Patent Abstracts of Japan, vol. 9, No. 79 (P–347) (1802) Apr. 9, 1985 & JP,A,59 210 520 (Yukio Ichinose) Nov. 29, 1984.
Patent Abstracts of Japan, vol. 11, No. 211 (P–594) Jul. 9, 1987 & JP,A,62 033 317 (Matsushita Electric Ind Co Ltd) Feb, 13, 1987.
Patent Abstracts of Japan, vol. 16, No. 430 (P–1417) Sep. 9, 1992 & JP,A,04 147 411 (Mitsubishi Electric Corp) May 20, 1992.
Patent Abstracts of Japan, vol. 13, No. 167 (P–861) Apr. 20, 1989 & JP,A,01 004 913 (NEC Kansai Ltd) Jan. 10, 1989.
Patent Abstracts of Japn, vol. 11, No. 91 (P–558) (2538) Mar. 23, 1987 & JP,A,61 242 313 (Hitachi Ltd) Oct. 28, 1986.
Patent Abstracts of Japan, vol. 11, No. 49 (P–547) Feb. 14, 1987 & JP,A,61 216 109 (Matsushita Electric Ind Co Ltd) Sep. 25, 1986.
IBM Technical Disclosure Bulletin, vol. 31, No. 12, May 1989, Armonk, N.Y., US, pp. 317–318. "Low Stress Dielectric Coatings for Copper Parts".
IBM Technical Disclosure Bulletin, vol. 34, No. 2, Jul. 1991, Armonk N.Y., US, pp. 19–20. "Thermal Ink Jet Heater Devices Incorporating Diamond–Like Carbon Films As Protective Overcoats".

* cited by examiner

Primary Examiner—David Davis
(74) Attorney, Agent, or Firm—Kinney & Lange, P.A.

(57) ABSTRACT

A magnetic structure is formed by depositing a layer of diamond-like carbon onto the exposed surface of an a first material and depositing a layer of second material onto the layer of diamond-like carbon. A photoresist is applied to the exposed surface of the second layer and is patterned in the form of the desire structure. The exposed portions of the second layer are removed with a wet etchant that does not attack the diamond-like carbon layer. Thereafter, any remaining photoresist is removed.

6 Claims, 2 Drawing Sheets

DIAMOND-LIKE CARBON AND OXIDE BILAYER INSULATOR FOR MAGNETORESISTIVE TRANSDUCERS

This is a divisional of application Ser. No. 08/571,469, filed Dec. 13, 1995.

BACKGROUND OF THE INVENTION

This invention is directed to a process for fabricating a thin film magnetic structure and the magnetic structure fabricated thereby.

Many magnetic transducers employ magnetic layers, or soft adjacent layers (SALs), adjacent an insulating material. In inductive heads, the insulating material might be used for a gap for the magnetic transducer. Typically, the insulating material is deposited first (such as on another magnetic layer or on a substrate) and the magnetic layer is patterned on top of the insulating layer. Typically, a photoresist is patterned in the desired shape of the magnetic layer and a wet chemical etchant is applied to the exposed portions of the magnetic layer to shape the magnetic layer into the desired pole. The etchant employed in removing unwanted portions of the magnetic layer also often attacks the desired insulating layer, resulting in a reduction of the thickness of the insulating layer and a compromise of the characteristics of the transducer. There is, accordingly, a need for an etchant stop to protect the insulating layer and to form a part of the resulting gap.

SUMMARY OF THE INVENTION

The present invention is directed to a magnetic structure having a magnetic layer and a layer of insulating material with a layer of diamond-like carbon sandwiched between the magnetic layer and the insulating layer. In one form of the invention, the structure is a magnetic transducer that includes a second magnetic layer and the insulating layer and layer of diamond-like carbon form a gap for the transducer.

According to one aspect of the present invention, a layer of diamond-like carbon is deposited onto the exposed surface of an insulating layer and a layer of magnetic material is deposited onto the layer of diamond-like carbon. A photoresist is applied to the exposed surface of the magnetic layer and is patterned to a desired shape. The exposed portions of the magnetic layer are removed with a wet chemical etchant that does not attack the diamond-like carbon layer. Thereafter, any remaining photoresist is removed. In one form of the invention, the insulating layer is deposited onto a base magnetic layer, and the insulating layer and layer of diamondlike carbon together form a gap for a magnetic transducer

DETAILED DESCRIPTION OF THE PREFERRED EMBODIMENTS

Figure 1:
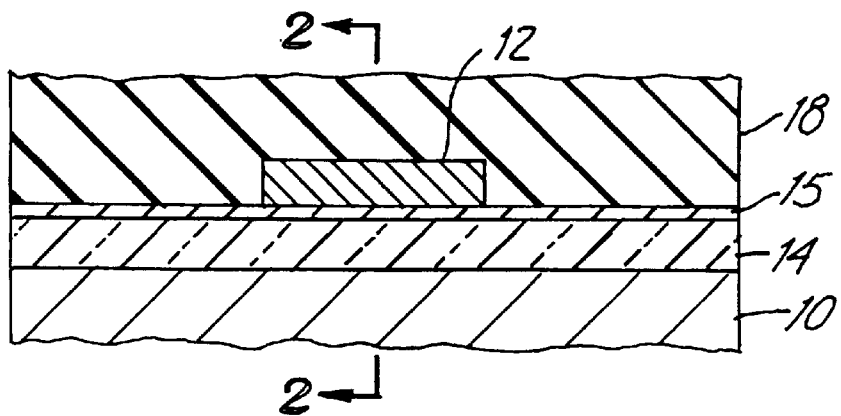
FIG. 1 is a section view taken at line 1—1 at FIG. 2, near the air bearing surface of a magnetic head in accordance with the present invention.

As shown in FIG. 1, a magnetic structure includes a lower magnetic layer 10, and upper magnetic layer 12 and a layer 14 of insulating oxide such as silicon dioxide ($SiO_2$) or aluminum oxide ($Al_2O_3$). Layer 15 of diamond-like carbon is formed over layer 14. Layers 10 and 12 are typically a nickel/iron metal alloy, such as Sendust or Permalloy. Layer 12 may be a soft adjacent layer (SAL) for a magnetoresistive (MR) head (not shown) above layer 12, and layer 10 may be a bottom shield (with layers 14 and 15 providing an insulating layer between them). Alternatively, layers 10 and 12 may be poles separated by a gap formed of layers 14 and 15, such as for a read or write head. In any case, the structure employs a layer of insulating oxide material such as $SiO_2$ or $Al_2O_3$ below a to-be patterned layer of magnetic material However, pinholes are formed in deposited layers of $SiO_2$ and $Al_2O_3$.

Prior use of only insulating $SiO_2$ or $Al_2O_3$ layers over the magnetic layer did not always protect the magnetic layer from etching when the magnetoresistive layer was etched. More particularly, if the insulating layer was not adequately thick, i.e., greater than about 750 to 1000 Angstroms, pinholes formed in the $SiO_2$ or $Al_2O_3$ layer allowed etchant to pass through the layer and attack the magnetic layer below. The present invention applies a diamond-like carbon layer over the insulating layer to protect the insulating layer and lower magnetic layer during subsequent processing.

Figure 2A:
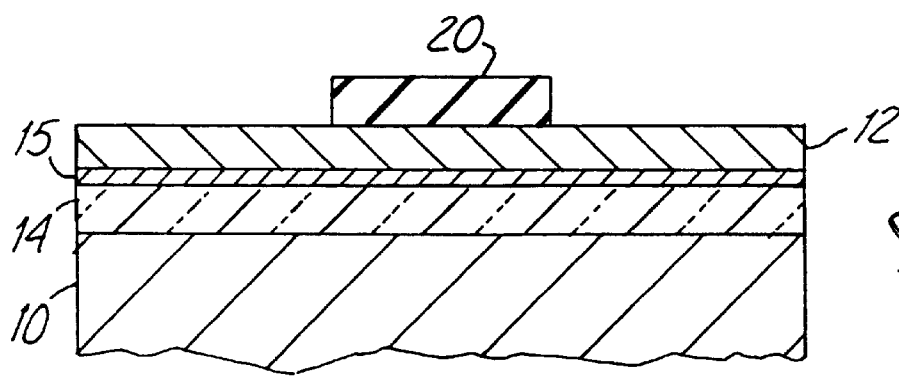
FIGS. 2A and 2B illustrate the process of forming the patterned magnetic pole in accordance with the present invention.
Figure 2B:
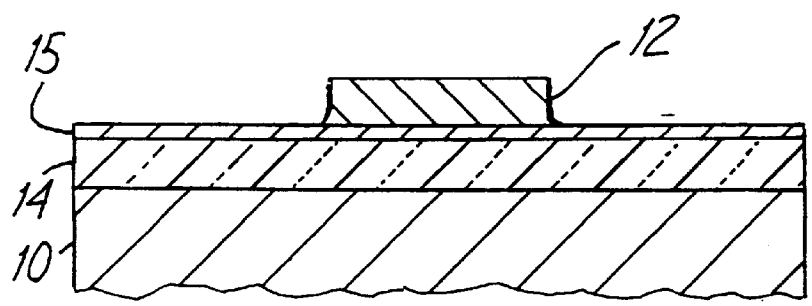

FIGS. 2A and 2B illustrate the process of forming the head structure shown in FIG. 1 in accordance with the presently preferred embodiment of the present invention. As shown in FIG. 2A, insulating layer 14 is deposited over the top surface of magnetic layer 10. Typically, layer 14 has a thickness of less than about 750 Angstroms, and therefore may have pinholes that could allow penetration of etchant. A layer of diamond-like carbon 15 is applied over layer 14, and magnetic layer 12 is applied over layer 15. Layer 15 may be quite thin, about 200 Angstroms being adequate in most cases. A layer of photoresist 20 is applied over the entirety of layer 12 and is patterned as shown in FIG. 2A to the desired shape of the SAL to be formed in layer 12. A wet acid etchant, such as one based on hydrochloric acid, is applied to the exposed portions of layer 12 to etch and remove the exposed portions of layer 12.

Most insulating materials, such as $SiO_2$ and $Al_2O_3$, form pinholes which permit passage of etchant. At thicknesses less than about 750 Angstroms, such insulating materials are poor etchant stops. One characteristic of diamond-like carbon is that it is substantially free of pinholes, even at thicknesses of about 200 Angstroms. Since the wet acid etchant does not attack the diamond-like carbon, the etchant cannot reach the insulating layer 14. As a result, the $SiO_2$ or $Al_2O_3$ insulating layer 14 is protected from the wet etchant by the diamond-like carbon layer 15 which is not attacked by that etchant. Upon completion of the etching of layer 12, the remaining photoresist 20 is dissolved, leaving the structure illustrated in FIG. 2B and ready for encapsulation as shown in FIG. 1.

Diamond-like carbon is commercially known as "DLC" and is commercially available from a variety of sources. The diamond-like carbon is similar to diamond in physical properties. The material is a hydrogenated carbon typically having a hydrogen content between about 30 to 50 percent and a large fraction of $sp^3$ carbon-carbon bonds rather than $sp^2$ found in ordinary graphite. The material is typically formed from a hydrogenated carbon feedstock, such as methane ($CH_4$), processed by any of a variety of processes, such as an ion beam deposition process. It is theorized that during formation of diamond-like carbon, hydrogen is removed from the feedstock material forming a network of $SP^3$ bonded carbon atoms, rather than an ordered array of Sp² bonded carbon, i.e. graphite. The material resembles a hard, highly cross-linked polymer and exhibits a higher thermal conductivity than common electrical insulating material (such as $SiO_2$ or $Al_2O_3$) and a high electrical resistivity, of the order of about $10^{10}$ Ω-cm. Diamond-like carbon films are similar to-diamonds in that they exhibit very high hardness ranges (1,000 to 5,000 on the Vickers hardness scale), a low coefficient of friction (of the order of less than 0.1) and densities between about 1.7 and 2.2. The material is commercially referred to as "diamond-like" because of its similarity in characteristics to natural and synthetic diamond. Moreover, like natural and synthetic diamond, the diamond-like carbon exhibits a high resistivity.

Diamond-like carbon is a good electrical insulator, although it is also highly thermally conductive. Hence, diamond-like carbon layer 15 forms part of the insulating or gap layer and provides dissipation of heat from the resulting head. Another advantage of the diamond-like carbon layer is that the layer is not susceptible to attack by the etchants used to etch the oxide layer, so the integrity of the oxide layer is maintained. Moreover, etchants ordinarily used in subsequent processing of the head do not attack diamond-like carbon. Thus, wet etchants used in shaping Ni/Fe magnetic films do not attack the diamond-like carbon etchant stop layer. As a result, the head is less susceptible of delamination during subsequent processing.

Figure 3A:
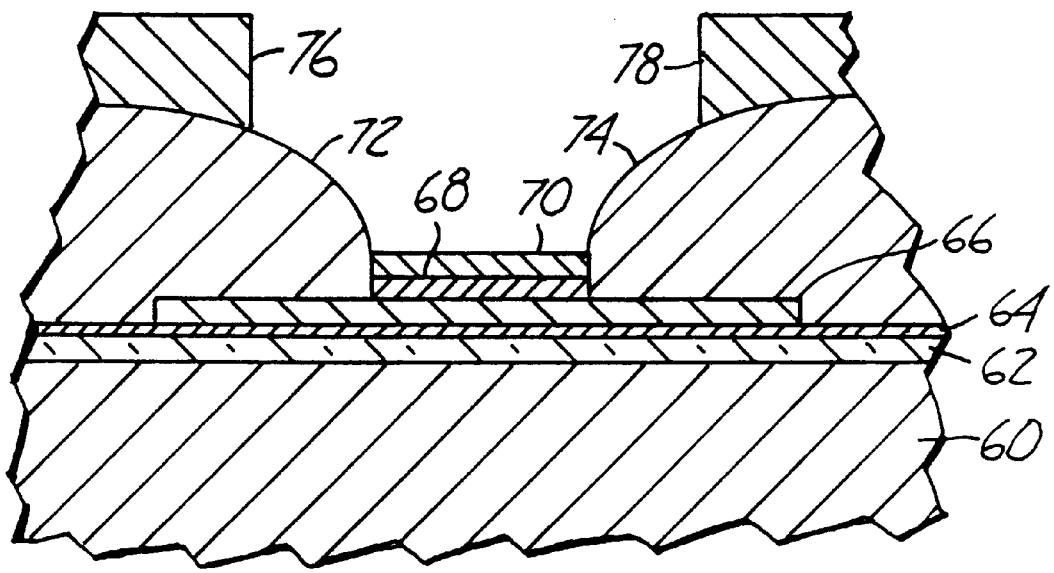
FIGS. 3A and 3B illustrate the process of milling a soft adjacent layer in an MR head using diamond-like carbon as part of the insulating underlayer.
Figure 3B:
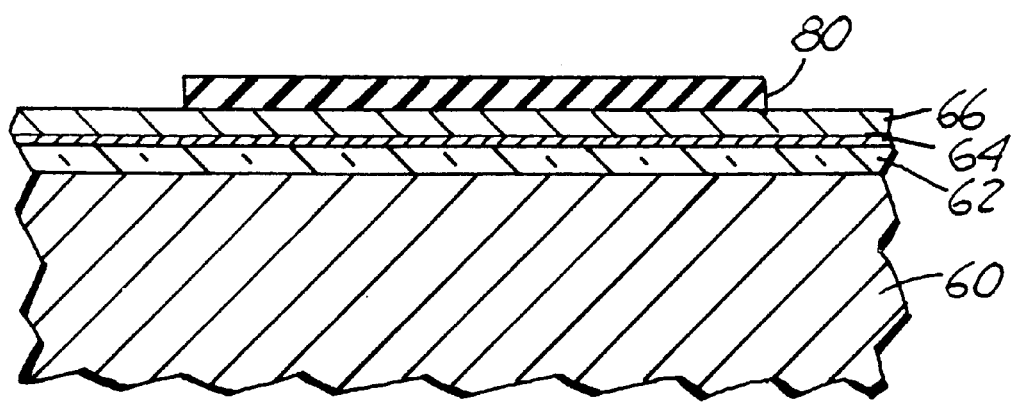

FIGS. 3A and 3B illustrate the use of a diamond-like carbon layer to control ion milling where the diamond-like carbon is left in the transducer as part of the insulating layer. FIG. 3A illustrates an MR head having a metal reader bottom shield 60 and an insulating layer 62 on layer 60. Insulating layer 62 is an insulating oxide, such as $Al_2O_3$ or $SiO_2$. A layer 64 of diamond-like carbon is deposited over layer 62, and a soft adjacent layer (SAL) 66 is formed over layer 64. A layer 68 of tantalum is formed over SAL 66, and a layer 70 of magnetic material forms the magnetoresistive element. Conductive layers 72 and 74 are formed of a cobalt-platinum alloy and provide electrical connection between gold or copper contacts 76 or 78 and opposite sides of MR element 70. Optionally, an additional insulating layer may be formed between SAL 66 and layer 68 to form a free SAL FIG. 3B illustrates the process of patterning SAL 66.

As shown in FIG. 3B, the magnetic material to form the SAL 66 is deposited on the top surface of the diamond-like carbon layer 64. A layer of photoresist 80 is formed on SAL layer 66 and patterned into the shape of the SAL The exposed portions of the photoresist layer 80 and SAL layer 66 are then ion milled to remove most photoresist and to mill to a depth at least equal to the thickness of SAL layer 66. The photoresist and SAL layer have approximately the same mill rate. However, the diamond-like carbon has a mill rate one-fifth that of the SAL Consequently, there is very little milling into the insulating layer formed of layer 62 and diamond-like carbon layer 64, thereby resulting in a well formed SAL fully patterned by ion milling without significant milling into the underlayer insulation. After the milling is completed, any remaining photoresist is exposed, dissolved and washed away. Moreover, since the diamond-like carbon is itself a good insulator, it may remain as part of the underlayer.

One feature of the invention is the fact that the diamond-like carbon is applied by an ion beam deposition directly onto layer 14 or 64. The simplicity of the ion beam process permits the formation of low defect films in the diamond-like carbon. Other techniques for applying the diamond-like carbon to layer 14 or 64 include radio frequency and direct current magnetron sputtering, carbon-arc deposition, laser ablation, and plasma enhanced chemical vapor deposition (PECVD).

Although the present invention has been described with reference to preferred embodiments, workers skilled in the art will recognize that changes may be made in form and detail without departing from the spirit and scope of the invention.

What is claimed is:

1. A magnetoresistive transducer having a magnetoresistive layer, a first magnetic layer forming a soft adjacent layer operatively associated with the magnetoresistive layer, a second magnetic layer forming a magnetic shield for the transducer, and an electrical insulator sandwiched between the first and second magnetic layers, characterized in that the electrical insulator contains a layer of insulating oxide material adjacent one of the first and second magnetic layers and a layer of thermally conductive, high electrical resistivity diamond-like carbon adjacent the other of the first and second magnetic layers.

2. The magnetic transducer of claim 1 where the layer of insulating oxide material is $SiO_2$.

3. In a magnetoresistive transducer having a magnetoresistive layer, a magnetic soft adjacent layer operatively associated with the magnetoresistive layer, and a magnetic shield layer forming a magnetic shield for the transducer, the improvement comprising insulating means sandwiched between the magnetic shield layer and the soft adjacent layer for electrically insulating the soft adjacent layer from the shield layer and for conducting heat from the transducer, the insulating means comprising a layer of insulating oxide material and a layer of thermally conductive, high electrical resistivity diamond-like carbon.

4. The magnetic transducer of claim 3 where the layer of insulating oxide material and the layer of diamond-like carbon are contiguous.

5. The magnetic transducer of claim 4 where the layer of insulating oxide material is $SiO_2$.

6. The magnetic transducer of claim 3 where the layer of insulating oxide material is $SiO_2$.

* * * * *